(12) United States Patent
Yoshikawa et al.

(10) Patent No.: US 9,426,231 B2
(45) Date of Patent: Aug. 23, 2016

(54) RESTRICTING A SCOPE OF A POST IN A SOCIAL NETWORKING SERVICE

(71) Applicant: Google Inc., Mountain View, CA (US)

(72) Inventors: Chad Owen Yoshikawa, Kirkland, WA (US); Thunder Parley, San Jose, CA (US); Ronald Ho, Fremont, CA (US); Jeffrey Gordon Ellingson, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 371 days.

(21) Appl. No.: 13/954,835

(22) Filed: Jul. 30, 2013

(65) Prior Publication Data

US 2014/0032672 A1 Jan. 30, 2014

Related U.S. Application Data

(60) Provisional application No. 61/677,434, filed on Jul. 30, 2012.

(51) Int. Cl.
*G06F 15/16* (2006.01)
*H04L 29/08* (2006.01)
*H04W 4/20* (2009.01)
*H04W 4/02* (2009.01)

(52) U.S. Cl.
CPC .............. *H04L 67/18* (2013.01); *H04W 4/206* (2013.01); *H04W 4/023* (2013.01)

(58) Field of Classification Search
None
See application file for complete search history.

(56) References Cited

U.S. PATENT DOCUMENTS

| 7,490,323 | B2 | 2/2009 | D'Alo et al. | |
| 7,844,671 | B1* | 11/2010 | Lawler | G06F 15/16 709/204 |
| 8,041,818 | B2 | 10/2011 | Gupta et al. | |
| 8,090,666 | B2 | 1/2012 | Sarbaev et al. | |
| 8,495,709 | B1* | 7/2013 | Cooper | H04L 51/12 713/153 |
| 2005/0198305 | A1* | 9/2005 | Pezaris | H04L 12/585 709/227 |
| 2007/0266097 | A1* | 11/2007 | Harik | G06Q 30/02 709/204 |
| 2011/0246574 | A1* | 10/2011 | Lento | G06Q 10/10 709/204 |
| 2012/0005221 | A1 | 1/2012 | Ickman et al. | |
| 2012/0054115 | A1 | 3/2012 | Baird-Smith et al. | |
| 2012/0109836 | A1 | 5/2012 | Chen et al. | |
| 2012/0174181 | A1 | 7/2012 | Zhang et al. | |
| 2012/0197980 | A1* | 8/2012 | Terleski | G06Q 50/01 709/203 |

FOREIGN PATENT DOCUMENTS

CN 1653819 A 8/2005
EP 2232796 A1 9/2010

* cited by examiner

*Primary Examiner* — Scott B Christensen
(74) *Attorney, Agent, or Firm* — McDermott Will & Emery LLP

(57) ABSTRACT

Systems and methods for restricting a scope of a post are provided. In some aspects, a post for a first set of users is received from a first user. An indication of the post is provided to at least a portion of the first set of users. A request to further share the post with a third user is received from a second user within the first set of users. A maximum scope for the post is determined. If the third user is within the maximum scope for the post is determined. The indication of the post is not provided to the third user if the third user is not determined to be within the maximum scope for the post.

19 Claims, 9 Drawing Sheets

200

Enter Post:

202 — San Francisco Sports skirts 50% off at JKL Dress Shop in downtown San Francisco!

204 — POST!

Set custom maximum scope:

User Data:

206 — ((Prefers San Francisco Sports) AND (gender = female)) OR (Prefers JKL Dress Shop)

Geography:

208 — (Current Location = San Francisco) OR (Home Location = within 100 kilometers of San Francisco) OR (Work Location = within 50 kilometers of San Francisco)

Time:

210 — (Date on or after 16-July-2012) AND (Date on or before 22-July-2012)

Require:

212 — [X] All of the above.

214 — [ ] At least one of the above.

216 — [ ] Custom

FIG. 2

RESTRICTING A SCOPE OF A POST IN A SOCIAL NETWORKING SERVICE

CROSS REFERENCE TO RELATED APPLICATION

This application claims priority under 35 U.S.C. §119(e) and the benefit of U.S. Provisional Application No. 61/677,434, filed Jul. 30, 2012, and entitled, "RESTRICTING A SCOPE OF A POST IN A SOCIAL NETWORKING SERVICE," the entire disclosure of which is incorporated herein by reference.

BACKGROUND

The subject technology generally relates to social networking services and, in particular, relates to restricting posts in a social networking service.

Some social networking services allow users to post data (e.g., text, images, or videos) and to share the data with all or a portion of their social contacts. The social contacts, in turn, may further share the posted data with others.

SUMMARY

In some innovative aspects, the disclosed subject matter relates to a computer-implemented method. The method includes receiving, from a first user, a post for a first set of users. The method includes providing an indication of the post to at least a portion of the first set of users. The method includes receiving, from a second user within the first set of users, a request to further share the post with a third user. The method includes determining a maximum scope for the post. The method includes determining if the third user is within the maximum scope for the post. The method includes foregoing providing the indication of the post to the third user if the third user is not determined to be within the maximum scope for the post.

These and other embodiments can include one or more of the following features. The method also includes: receiving, from the first user, an indication of the maximum scope, where the maximum scope for the post is determined based on the received indication of the maximum scope. The maximum scope for the post includes all or a portion of users within a domain. The domain is defined statically. The domain is defined dynamically. The maximum scope is defined based on one or more attributes. The maximum scope is defined based on a geographic location. The geographic location specification includes one or more of a current geographic location, a home geographic location, a work geographic location, or a default geographic location. The maximum scope is defined based on a time specification, and the time specification includes at least an end time. The maximum scope is defined with one or more logical operators. The method also includes: determining that the first set of users includes a subset of users, where the subset of users is not within the maximum scope for the post; providing, to the first user, an indication that the subset of users is not within the maximum scope for the post; and receiving, from the first user, an indication of intent to broaden the maximum scope to include at least a portion of the subset of users or an indication of intent to forego sharing the post with the subset of users. The method also includes: receiving, from a fourth user, a request to view the post; determining whether the post has been shared with the fourth user; determining whether the fourth user is within the maximum scope for the post; if the post has been shared with the fourth user and the fourth user is within the maximum scope for the post: providing, to the fourth user, the post for display; and if the post has not been shared with the fourth user or the fourth user is not within the maximum scope for the post: foregoing providing, to the fourth user, the post for display. The first set of users includes a fourth user. The fourth user is associated with an electronic messaging address that is not associated with an account within the social networking service. The method also includes: determining, based on the electronic messaging address, that the fourth user is within the maximum scope for the post; and providing an indication of the post to the fourth user via the electronic messaging address. A default maximum scope is set by an administrator. The determined maximum scope for the post is different from the default maximum scope set by the administrator. The method also includes: receiving, from the first user, an indication of the maximum scope, where the maximum scope for the post is determined based on the received indication of the maximum scope; and verifying that the determined maximum scope for the post is narrower than or identical to the default maximum scope set by the administrator.

In some innovative aspects, the disclosed subject matter relates to a computer-readable medium encoded with executable instructions. The instructions include code for providing a first user interface element for entering a post for a social networking service for display. The instructions include code for providing a second user interface element for selecting one or more viewing users with which to share the post for display. The instructions include code for providing a third user interface element for selecting a maximum scope for the post for display. The instructions include code for receiving an indication of the post and a selection of the one or more viewing users. The instructions include code for, if the maximum scope selected in the third user interface element includes the one or more viewing users selected in the second user interface element, providing, to at least a portion of the one or more viewing users, an indication of the post. The instructions include code for, if the maximum scope indicated in the third user interface element does not include at least one of the one or more viewing users selected in the second user interface element, providing an input for modifying the selected maximum scope or the selected one or more viewing users.

These and other embodiments can include one or more of the following features. The instructions also include code for: receiving a selection of the maximum scope. The third user interface element indicates a default maximum scope. The third user interface element is configured to receive, from the user, an input for selecting a maximum scope different from the default maximum scope. The default maximum scope is selected by an administrator. The received selection of the maximum scope includes the default maximum scope. The first user interface element includes an input box for entering text. The second user interface element includes one or more selectors for one or more social groups or one or more individual users of a social networking service. The third user interface element includes one or more selectors for one or more social groups or one or more individual users of a social networking service.

In some innovative aspects, the disclosed subject matter relates to a system. The system includes one or more processors and a memory. The memory includes instructions executable by the one or more processors. The instructions include code for receiving, from an administrator for plural users of a social networking service, a maximum scope for posts by the plural users. The instructions include code for receiving, from a first user from among the plural users of the social networking service, a post for the social networking service and a selection of a first set of users with which to share the post. The instructions include code for, if the maximum scope includes the first set of users, providing an indication of the post to at least a portion of the first set of users. The instructions include code for, if at least one user in the first set of users is not included in the maximum scope, providing, to the first user, an indication that the at least one user is not included in the maximum scope.

These and other embodiments can include one or more of the following features. The instructions also include code for: determining, based on settings entered by the administrator, whether the maximum scope is user-modifiable; if the maximum scope is user-modifiable, providing instructions, to the first user, to modify the maximum scope or the first set of users; and if the maximum scope is not user-modifiable, providing a notification, to the first user, that the post cannot be shared with the at least one user.

Advantageously, the subject technology allows a user of a social networking service to provide a maximum scope for his/her posts in the social networking service. In some aspects, the user may use the maximum scope feature, to prevent information posted by him/herself from being provided outside his/her business or his/her family. For example, a user may wish to tell his/her family members that he/she is having a child, while preventing this information from being decimated to users outside his/her family. Alternatively, a user may wish to update his/her coworkers on the status of a project, while preventing this information from being provided to people outside the business.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

FIG. 2 illustrates an example interface for setting a maximum scope for posted data within a social networking service.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

As set forth above, some social networking services allow users to post data (e.g., text, images, or videos) and to share the data with all or a portion of their social contacts. The social contacts, in turn, may further share the posted data with others. However, a user posting data may not wish for the data to be further shared with other users of the social networking service. For example, a user posting data related to a project in his/her business may not want this information to be provided to users outside the business. Similarly, a user posting data related to a social event may not want this information to be provided to users outside his/her peer group and their spouses. As the foregoing illustrates, an approach for restricting a scope of a post in a social networking service may be desirable.

The subject technology provides techniques for restricting a scope of a post in a social networking service. In some aspects, when posting data, a user may share the data with a first set of users and set a maximum scope of which users can view the data, which may be broader than the first set of users. The maximum scope may be selected by the user or a default maximum scope may be set up for the user by an administrator (e.g., an enterprise administrator for an enterprise account in the social networking service). The maximum scope defines limits for sharing or re-sharing posts. For example, a post can be shared or further shared with other user(s) within the maximum scope, but not with users outside the maximum scope. In some aspects, the maximum scope can be dynamic. The maximum scope can be specified based on rules or policies such that the maximum scope can change over time. The maximum scope may be administrator defined, attribute-based, location-based, and/or time-based.

Figure 1A:
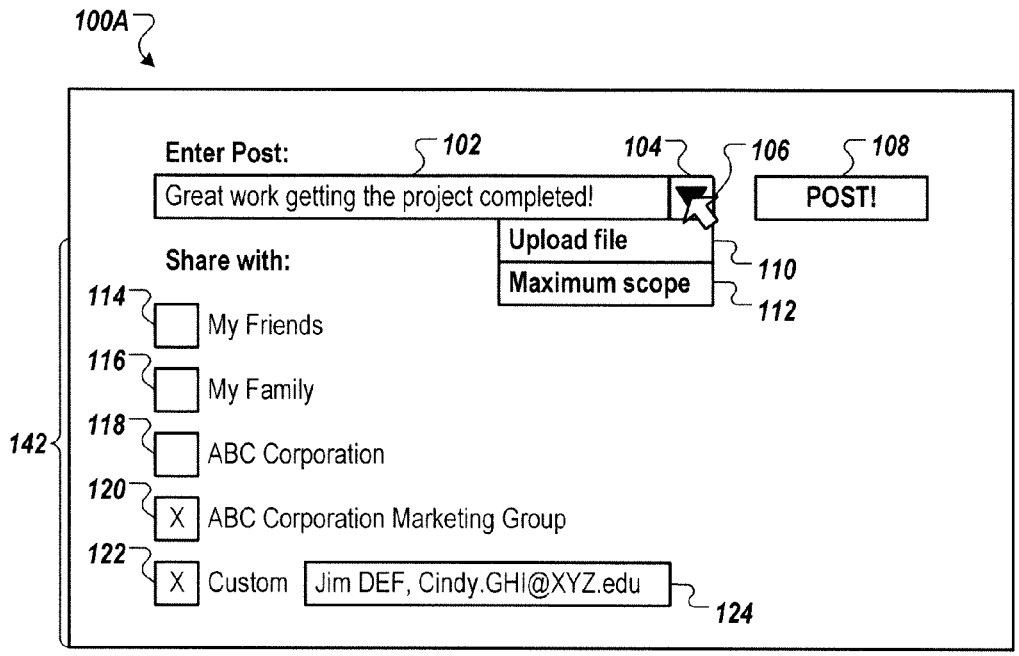
FIGS. 1A-1C illustrate example interfaces for posting data in a social networking service.
Figure 1B:
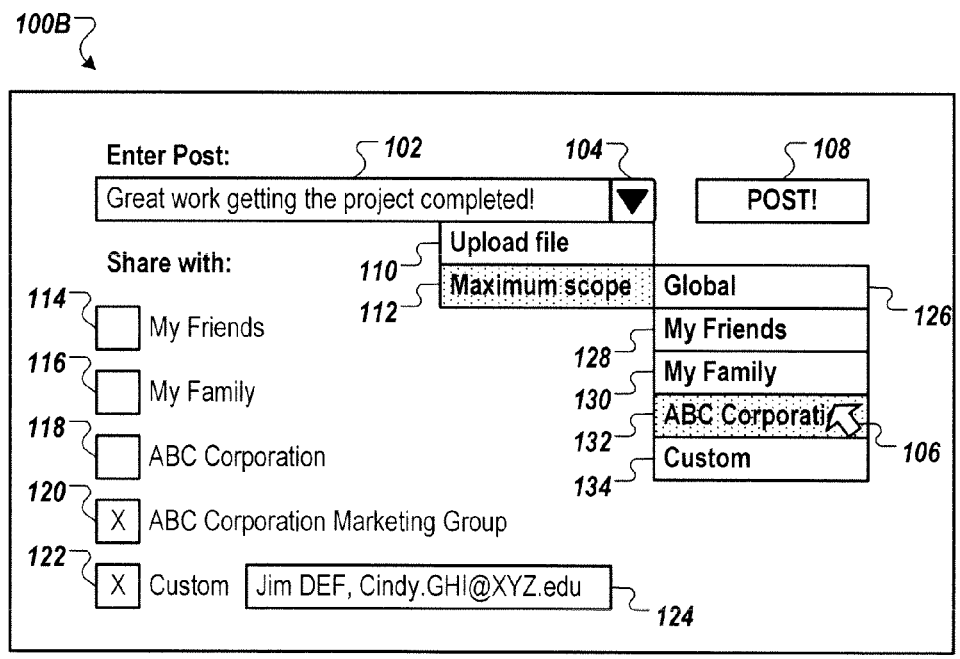
Figure 1C:
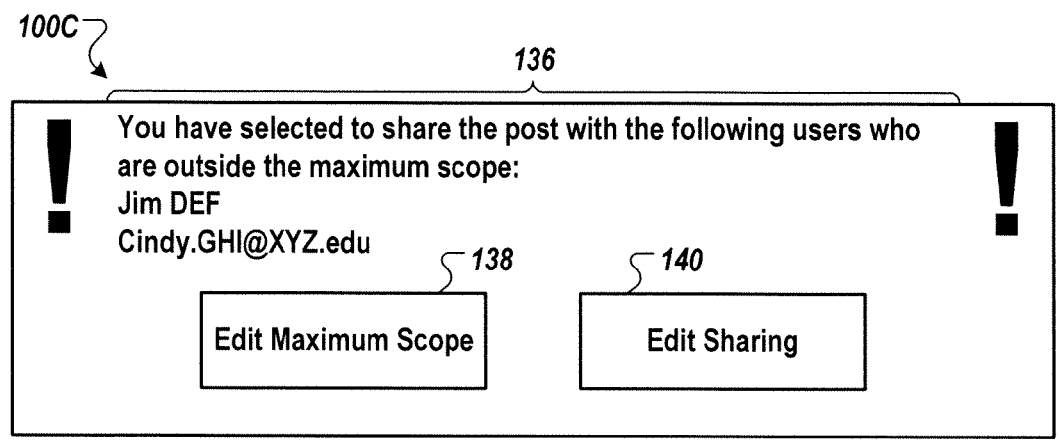

FIGS. 1A-1C illustrate example interfaces for posting data in a social networking service.

FIG. 1A illustrates a window 100A of an application for posting data in a social networking service. The application may be a webpage displayed via a web browser, an application executing within a web browser, a laptop or desktop computer application, a mobile phone application, a tablet computer application, a personal digital assistant (PDA) application, etc. As shown, the window 100A includes an input box 102, a dropdown arrow 104, a post button 108, and a sharing interface 142 that includes elements 114, 116, 118, 120, 122, and 124 for selecting one or more users with whom to share the post.

The input box 102 is a text box for entering a post. As shown, the user of the window 100A has entered, in the input box 102, the text "Great work getting the project completed!" The dropdown arrow 104, when selected, for example, via cursor 106, causes a menu to appear. The menu includes an upload file button 110 and a maximum scope button 112. The upload file button 110, when selected, provides an interface for uploading a file (e.g., an image file, a video file, an audio file, etc.) to the social networking service with the post. The maximum scope button 112, when selected or hovered over, causes an interface for selecting a maximum scope to appear. Example interfaces for selecting a maximum scope are described in detail in conjunction with FIG. 1B, FIG. 1C, and FIG. 2, below. The post button 108, when selected, causes the post, entered in input box 102, to be posted to the social networking service, and shared with the user(s) selected via the sharing interface 142.

The sharing interface 142 includes check boxes 114, 116, 118, 120, and 122 for selecting user(s) of the social networking service with whom to share the post in input box 102. The user may select one or more individual users (e.g., Jim DEF) with whom to share the post and/or one or more groups of users (e.g., ABC Corporation Marketing Group) with whom to share the post. For example, the user creating the post may choose to share the post with "My Friends" 114, "My Family" 116, "ABC Corporation" 118, "ABC Corporation Marketing Group" 120, or custom contact(s) 122 entered by the posting user in input box 124.

In some aspects, "My Friends" 114 and "My Family" 116 may correspond to user-defined social groups defined by the posting user accessing the window 100A. "ABC Corporation" 118 and "ABC Corporation Marketing Group" 120 may correspond to symmetric social network groups that are defined by an administrator. For example, the "ABC Corporation" 118 group may include all users who have an electronic messaging (e.g., email) address associated with ABC Corporation, e.g., *@abc.com. "ABC Corporation Marketing Group" 120 may correspond to a subset of the "ABC Corporation" 118 group, as defined by the user or an administrator of ABC Corporation.

As used herein, "user-defined social groups" are categories to which users can assign their social networking contacts and better control the distribution and visibility of social networking messages. In accordance with aspects of the subject disclosure, a user-defined social group is provided as a data set defining a collection of contacts that are associated with one another. A user-defined social group can be described from the perspective of an individual that is the center of a particular collection of socially interconnected people, or from the aggregate perspective of a collection of socially interconnected people. A user-defined social group can have narrowly defined boundaries, all of the members of the user-defined social group may be familiar with one another, and permission may be required for a member to join a user-defined social group. A user of an electronic device may define a user-defined social group, and the user-defined social group, as a data set defining a collection of contacts, may reflect a real-life social group of the user.

As shown in FIG. 1A, the posting user of window 100A has selected to share the post with ABC Corporation Marketing Group 120 and custom users 122, as indicated in input box 124. The custom users indicated in input box 124 are Jim DEF and Cindy.GHI@XYZ.edu. The custom user may be outside the ABC Corporation Marketing Group 120. Jim DEF may be a user of the social networking service identified by an account. Cindy.GHI@XYZ.edu may lack an account with the social networking service, or the posting user may not know that Cindy.GHI@XYZ.edu has such an account. As a result, Cindy.GHI@XYZ.edu may be identified by an electronic messaging (e.g., email) address rather than by a name or social networking account title.

In one example, a user of an electronic device who has an individual account in the social networking service may have different groups of friends, coworkers and family, and there may be some overlap among those groups (e.g., a coworker who is also considered to be a friend, a family member who is also a coworker). Through the creation and use of user-defined social groups, the user can organize and categorize social networking contacts into various different groupings.

FIG. 1B illustrates a window 100B. The window 100B corresponds to the window 100A, with the maximum scope button 112 selected. As a result of the selection of the maximum scope button 112, a maximum scope menu, containing buttons 126, 128, 130, 132, and 134, is presented to allow the posting user to set a maximum scope for the post in input box 102. The post can be further shared by users who receive the post only to users within the maximum scope. Users outside the maximum scope cannot view the post. In some aspects, a default maximum scope is set by an administrator. In some aspects, the administrator may create the maximum scope and the user may be unable to change the maximum scope. Alternatively, the user may be able to select a narrower maximum scope, but not a broader maximum scope, than that selected by the administrator. In some implementations, the administrator provides a default maximum scope and the user provides a user input maximum scope. The determined maximum scope, which is enforced on the post, corresponds to the intersection of the administrator-provided default maximum scope and the user input maximum scope. The administrator may be an enterprise administrator who can only set the maximum scope for users associated with the enterprise.

As shown, the maximum scope menu includes a Global button 126, a "My Friends" button 128, a "My Family" button 130, an "ABC Corporation" button 132, and a "Custom" button 134. The Global button 126, when selected, sets a global maximum scope for the post (i.e., the post may be further shared with anyone). The "My Friends" 128, "My Family" 130, and "ABC Corporation" 132 buttons, when selected, set the maximum scope as indicated (i.e., the post may be further shared only with users within the identified group). As shown, the user has selected the "ABC Corporation" button 132 via cursor 106. The Custom button 134, when selected, provides an interface for setting a custom maximum scope for the post (e.g., window 200 of FIG. 2, described in detail below). The custom maximum scope may include, for example, any custom set of users as defined, for example, via Boolean operators (e.g., AND, OR, XOR, or NOT).

As illustrated in FIGS. 1A and 1B, the posting user has set the maximum scope for the post to ABC Corporation 132 (via cursor 106 in FIG. 1B). However, the user has shared the post with Jim DEF and Cindy.GHI@XYZ.edu in input box 124, where Jim DEF and Cindy.GHI@XYZ.edu are not members of the ABC Corporation group. Sharing the post with users outside the maximum scope is inconsistent as, under the maximum scope, the users outside the maximum scope cannot view the post. However, the posting user may modify the maximum scope. As a result of the inconsistency of the maximum scope with the set of users with who the post is to be shared, in some implementations, pop-up window 100C of FIG. 1C or a similar interface may be presented. As shown, the pop-up window 100C notifies the user of the inconsistency and provides buttons to correct the inconsistency. Alternatively, the maximum scope may be automatically adjusted to the union of the specified maximum scope and the users with whom the posting user has shared the post.

As shown, the pop-up window 100C includes a message 136, an "Edit Maximum Scope" button 138, and an "Edit Sharing" button 140. The message 136 indicates that the posting user has selected to share the posts with users who are outside the maximum scope. The "Edit Maximum Scope" button 138, when selected, allows the posting user to modify the maximum scope to include all of the users with whom the posting user shared the post. The "Edit Sharing" button 140, when selected, allows the posting user to modify the users with whom he/she is sharing the post to ensure that the users with whom the post is shared are within the maximum scope. The ability to modify the maximum scope may be limited to the posting user or an administrator. A user who further shares an existing post may not broaden its maximum scope and, as a result, may not share the post with user(s) outside of the maximum scope.

FIG. 2 illustrates an example interface window 200 for setting a maximum scope for posted data within a social networking service. The interface window 200 may be used as an alternative to or in place of the interface windows 100A, 100B, and 100C of FIG. 1.

The window 200 may be provided by an application executing on a client computing device. The application may be a web browser displaying a webpage, a web browser executing a browser application, a laptop or desktop computer application, a tablet computer application, a mobile phone application, or a personal digital assistant (PDA) application.

As shown, the window 200 includes a post input box 202, a post button 204, an upload file button 205, maximum scope input boxes 206, 208, and 210, and requirement selectors 212, 214, and 216.

The post input box 202 is configured to receive (e.g., via operation of a mouse and keyboard) an input for a post. The input may be text, an image, a video, or an audio file. As shown, the input includes a text sentence advertising a sale in a store in San Francisco during the week of Jul. 16-22, 2012.

The post button 204, when selected, is configured to share the post with at least one user based on sharing settings for the post (e.g., as entered via the interface 114, 116, 118, 120, 122, or 124 of FIG. 1A or a similar interface). The upload file button 205, when selected, is configured to allow a user to upload a file to post to the social networking service. The file may be posted in conjunction with or in place of the text in the post input box 202.

The maximum scope input boxes include a user data input box 206, a geography input box 208, and a time input box 210. The text within the input boxes 206, 208, and 210 is entered by a posting user accessing the window 200. In some examples, the user is required to follow syntax rules for entering text into input boxes 206, 208, and 210. For example, the user may be required to enter Boolean expressions, with multiple parts of the expression expressed within parentheses and connected with one another using logical operators, for example, AND, OR, or XOR. In some examples, text may be entered into input boxes 206, 208, and 210 in free form. The free form text may be converted to a Boolean expression using artificial intelligence stored at a server. The user data input box 206 may include a Boolean expression based on any characteristics of users known to the social networking service and accessible to the posting user. Specific characteristics (e.g., lives in Seattle) or attributes (e.g., gender is male or is a fan of Boston sports teams) may be input to the Boolean expression. Boolean expression (s) using different characteristics or attributes may be used to define the maximum scope. For example, as shown in input box 206, the user entered the Boolean expression: "((Prefers San Francisco Sports) AND (gender=female)) OR (Prefers JKL Dress Shop)." Thus, under the maximum scope, the post may be shared with users of the social networking service who are known to the posting user to have the characteristics in the Boolean expression, but not to other users. These users may be known or believed by the posting user to have a greater interest in the sale at the store in San Francisco than other users. A user of a social networking service may "prefer" a webpage, sports team, business, etc., if he/she indicated to the social networking service that he/she is interested in the object of preference. In some examples, the user explicitly indicates item(s) that he/she prefers. For example, the user may click a "prefer" button on a page associated with a sports team in the social networking service to indicate his/her preference for the sports team. Alternatively, the user's preference may be implied form user activity that is known in the social networking service. For example, if a user enters multiple posts about the Boston Red Sox sports team, the user is likely to be interested in or have a preference for the Boston Red Sox. The user is provided with an indication that his/her preference for certain item(s) is implied, and the user provides affirmative consent for his/her preference to be stored by the social networking service.

The geography input box 208 is configured to receive a Boolean expression related to geographic information of users of the social networking service who are to be placed within the maximum scope for the post. The geographic information may be based on geographic location(s) of the users, e.g., a home location, a work location, a default location, or a current location. Any user of the social networking service may share one or more of the above locations for him/herself as either an exact location (e.g., a street address) or a non-exact location (e.g., a city or a state). For example, a user may list his/her work geographic location as "Miami, Fla.," and share this location only with his/her social contacts, and refuse to share his/her current geographic location with the social networking service. As shown, a user is within the maximum scope for the post only if his/her current geographic location is San Francisco, his/her home geographic location is within 100 kilometers of San Francisco, or his/her work geographic location is within 50 kilometers of San Francisco. The posting user may have selected these characteristics as users who live or work near San Francisco, or who are currently located in San Francisco, are more likely to visit the store that users who are not in San Francisco.

The time input box 210 is configured to receive a Boolean expression related to time information. As shown, the time input box 210 indicates that the date is on or after Jul. 16, 2012, and the date is on or before Jul. 22, 2012. The posting user may have selected these characteristics, as the post is not relevant before Jul. 16, 2012, or after Jul. 22, 2012, as the sale that the post is discussing is not taking place during those dates.

The requirement selectors 212, 214, and 216, allow the posting user to select to require all of the above (i.e., user data input box Boolean expression AND geography input box Boolean expression AND time input box Boolean expression), at least one of the above (i.e., user data input box Boolean expression OR geography input box Boolean expression OR time input box Boolean expression), or a custom combination of the Boolean expressions (e.g., (user data input box Boolean expression AND geography input box Boolean expression) OR time input box Boolean expression).

It should be noted that FIGS. 1A-1C and 2 illustrate some possible user interfaces for the subject technology. The subject technology may be used in conjunction with user interfaces that are set up in different ways. For example, a posting user may be able to indicate a geographic location on a map or indicate a time on a calendar instead of typing the geographic location and time into a text input box, as illustrated.

In some aspects, a user may have multiple accounts with a social networking service, for example, a personal account associated with his/her personal electronic messaging (e.g., email) address and an enterprise account associated with his/her enterprise electronic messaging address. The enterprise account may be administered by an enterprise administrator, while the personal account may not be associated with an enterprise administrator. In some aspects, a user can have only a personal account or only an enterprise account with the social networking service. In other aspects, the user can have multiple personal or multiple enterprise accounts. For example, a user can have a first enterprise account with his/her employer and a second enterprise account with his/her university.

The enterprise administrator may define a default maximum scope for posts by the enterprise user account (e.g., default maximum scope is visible only to users associated with the enterprise, e.g., ABC Corporation). With a default maximum scope, the posting user may override the maximum scope for any post. For example, if the default maximums scope is ABC Corporation, the posting user may change the maximum scope to Global, My Friends, ABC Corporation Marketing Group, etc., for example, via one or more of the interfaces 100A, 100B, 100C, or 200.

Alternatively, the enterprise administrator may provide a required maximum scope (e.g., ABC Corporation) for posts by users of the enterprise social networking accounts. Under the required maximum scope, a user can set a narrower maximum scope for an individual post, but not a broader maximum scope. For example, the user can set the maximum scope to ABC Corporation Marketing Group (which is a subset of ABC Corporation) but not to Global.

The posting users may be notified of any limitations or default settings created by the administrator. The user may view or modify the maximum scope for his/her posts, for example, via one or more of the interfaces 100A, 100B, 100C, or 200.

In some aspects, the posting user may be provided with a warning if he/she is making a post, via his/her enterprise account, with a maximum scope that includes users outside the enterprise. The warning may be similar to the interface 100C.

Figure 3:
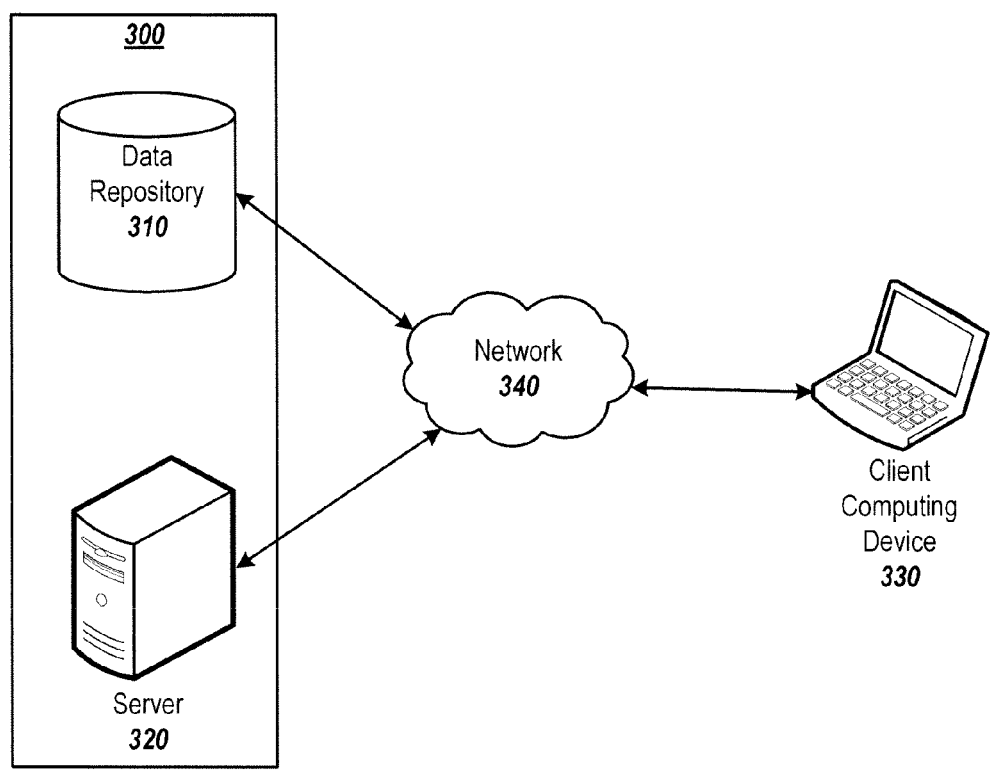
FIG. 3 illustrates an example of a system for restricting a scope of a post in a social networking service.

FIG. 3 illustrates an example of a system 300 for restricting a scope of a post in a social networking service. As shown, the system 300 includes a data repository 310 and a server 320. The data repository 310 and the server 320 communicate with one another and with and a client computing device 330 via a network 340. The network 340 may include the Internet, an intranet, a local area network, a wide area network, a wired network, a wireless network, or a virtual private network (VPN). While only one data repository 310, server 320, and client computing device 330 are illustrated, the subject technology may be implemented in conjunction with any number of data repositories 310, servers 320, or client computing devices 330. In some aspects, a single machine may implement the functions of two or more of the data repository 310, the server 320, or the client computing device 330.

The data repository 310 may store posts associated with a social networking service and related information (e.g., the posting entity, viewing entities, or maximum scope). One example of the data repository 310 is described in more detail in conjunction with FIG. 4 below.

The server 320 may include one or more modules for facilitating user interaction with the social networking service via a browser or a special purpose application executing on the client computing device 330. The server 320 may be implemented as a single machine with a single processor, a multi-processor machine, or a server farm including multiple machines with multiple processors. One example of the server 320 is described in more detail in conjunction with FIG. 5 below.

The client computing device 330 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 330 may include one or more of a keyboard, a mouse, a display, or a touch screen. The client computing device 330 may also include a web browser configured to display webpages, for example a webpage of the social networking service or webpages associated with one or more of the windows 100A, 100B, 100C, or 200. Alternatively, windows 100A, 100B, 100C, or 200 associated with the social networking service may be presented on the client computing device 330 via a special purpose application, which may be associated with the social networking service.

Figure 4:
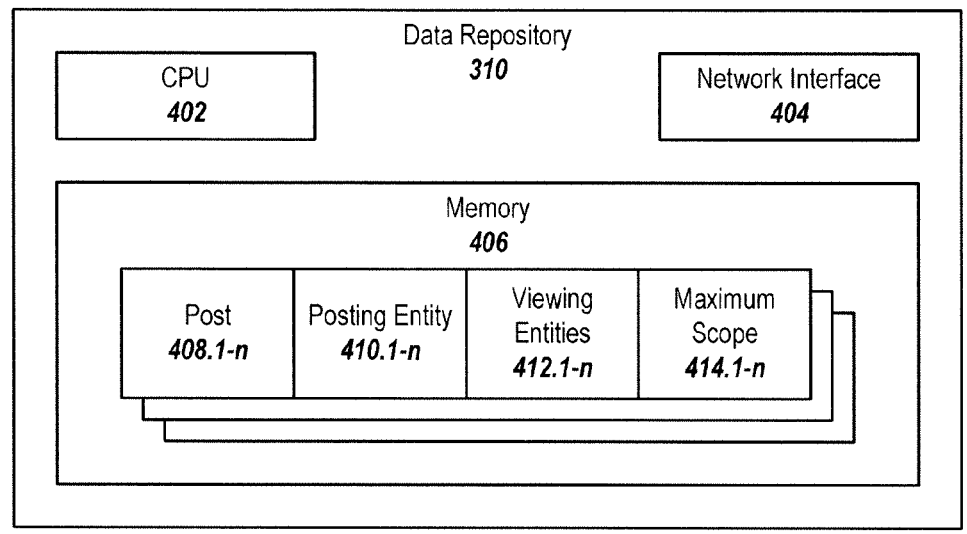
FIG. 4 illustrates an example of the data repository of FIG. 3.

FIG. 4 illustrates an example of the data repository 310 of FIG. 3. As shown, the data repository 310 includes a central processing unit (CPU) 402, a network interface 404, and a memory 406. The CPU 402 may include one or more processors. The CPU 402 is configured to execute computer instructions that are stored in a computer-readable medium, for example, the memory 406. The network interface 404 is configured to allow the data repository 310 to transmit and receive data in a network, e.g., network 340 of FIG. 3. The network interface 404 may include one or more network interface cards (NICs). The memory 406 stores data and/or instructions. The memory 406 may be one or more of a cache unit, a storage unit, an internal memory unit, or an external memory unit. As illustrated, the memory 406 includes posts 408.1-$n$. Each post 408.$k$ is associated with a posting entity 410.$k$, viewing entities 412.$k$, and a maximum scope 414.$k$.

Each post 408.1-$n$ may include text, an image, a video, and/or an audio file posted to a social networking service.

The posting entity 410.1-$n$ is a user of the social networking service who created the post. For example, as shown in FIG. 1B, the post "Great work getting the project completed!" has, as its posting entity, a user of the social networking service who is accessing the page 100B.

The viewing entities 412.1-$n$ are entities who have been given permission to view the post—with whom the post has been shard or to whom the post has been forwarded or further shared. Viewing entities 412.1-$n$ may further share the post, creating additional viewing entities within the maximum scope. For example, User X may be a posting entity and may share the post with User Y, who may further share the post with User Z. In this case, User X is the posting entity and Users Y and Z are the viewing entities. As shown in FIG. 1B, the viewing entities of the post are ABC Corporation Marketing Group, Jim DEF, and Cindy.GHI@XYZ.edu.

The maximum scope 414.1-$n$ corresponds to a maximum group of viewing entities 412.1-$n$ that a post can possibly have. In some aspects, the maximum scope 414.1-$n$ may be global. Alternatively, the maximum scope 414.1-$n$ may correspond to one or more user-defined social groups, one or more business affiliations, or a custom group of people. The maximum scope 414.1-$n$ may be expressed in terms of a group of people, a time restriction, or a geographic restriction, as illustrated in FIG. 1B (maximum scope options 126, 128, 130, 132, and 134) and FIG. 2 (maximum scope input boxes 206, 208, and 210).

The maximum scope 414.1-$n$ may include static elements that are rarely changed (e.g., user accounts that are associated with the enterprise ABC Corporation, user accounts that indicate a residence in San Francisco, user accounts of female users, etc.). The maximum scope 414.1-$n$ may include dynamic elements that are frequently changed (e.g., user accounts that are sharing their geographic location and are currently located within 5 kilometers of JKL Supermarket, user accounts that are accessing the social networking service during the week Jul. 16-22, 2012, user accounts that entered geographic check-ins at JKL Supermarket within the last month, etc.). In some aspects, the maximum scope 414.1-$n$ includes both static and dynamic elements (e.g., user accounts that are associated with the enterprise ABC Corporation and that entered geographic check-ins at JKL Supermarket within the last week).

The maximum scope 414.1-$n$ for a post 408.1-$n$ may be defined based on any attribute known about a user account by the social network that the user permits the social network to store and to use for sharing posts with the user. The user may access the information that the social network stores about the user (e.g., the user's preferences, geographic location, employer, educational history, etc.) and may modify or remove this information from the social networking service at any time. For example, a post may be shared with accounts of users having an age between 18-24, users being fans of a certain baseball team, users who are interested in chess, etc. The users voluntarily provide their age, their interest in the baseball team, their interest in chess, etc., to the social network and can remove this information from the social network at any time. In one example, a maximum scope 414.$k$ may restrict sharing of a post 408.$k$ to employees of ABC Corporation who are viewing the post in the month of January, are interested in chess, currently reside in Texas, and went to high school in the United States but not in the State of Texas. The above maximum scope could be written as a Boolean expression with logical operators.

Figure 5:
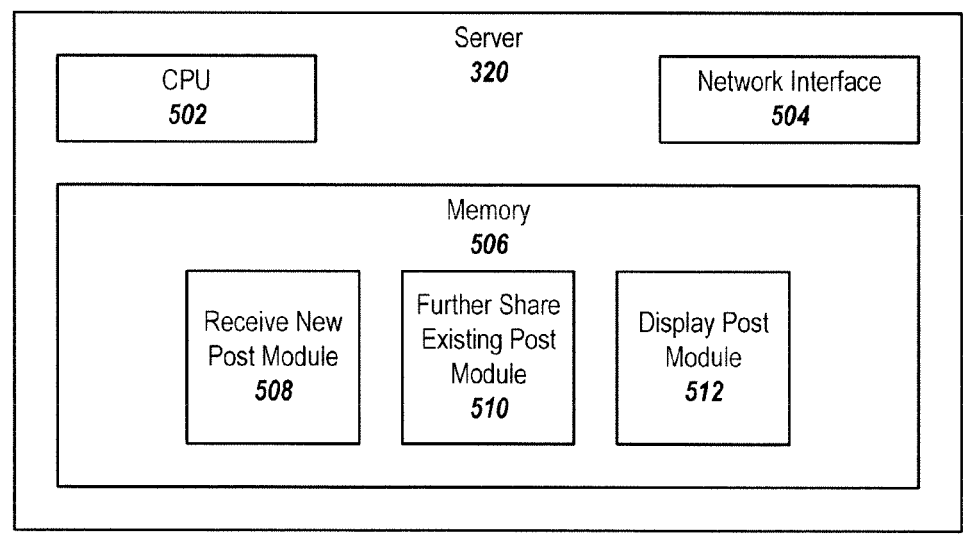
FIG. 5 illustrates an example of the server of FIG. 3.

FIG. 5 illustrates an example of the server 320 of FIG. 3. As shown, the server 320 includes a central processing unit (CPU) 502, a network interface 504, and a memory 506. The CPU 502 may include one or more processors. The CPU 502 is configured to execute computer instructions that are stored in a computer-readable medium, for example, the memory 506. The network interface 504 is configured to allow the server to transmit and receive data in a network, e.g., network 340 of FIG. 3. The network interface 504 may include one or more network interface cards (NICs). The memory 506 stores data and/or instructions. The memory 506 may be one or more of a cache unit, a storage unit, an internal memory unit, or an external memory unit. As illustrated, the memory 506 includes a receive new post module 508, a further share existing post module 510, and a display post module 512.

The receive new post module 508 is configured to receive, via a first user account of a social networking service, a post (e.g., post 408.$k$) for the social networking service, a selection of a first set of user accounts with which to share the post (viewing entities 412.$k$), and an indication of a maximum scope for the post (414.$k$). The post, the first set of user accounts with which to share the post, and the indication of the maximum scope may be received via a client computing device (e.g., client computing device 330) using interface 100A, 1 OOB, or 200, or a similar interface. For example, as shown in FIG. 1B, the post is "Great work getting the project completed!" The first set of users with which to share the post is ABC Corporation Marketing Group, Jim DEF, and Cindy.GHI@XYZ.edu. The maximum scope is ABC Corporation. The receive new post module 508 is also configured to provide an indication of the post to at least a portion of the first set of user accounts with which to share the post. For example, when a user accesses the social networking service via an account with which the post was shared (an account in the first set), the post may be presented in a feed for the account in the social networking service.

The further share existing post module 510 is configured to receive, via an account of a user who is permitted to view a post (e.g., a viewing entity 412.$k$ or a member of the first set of user accounts described above) a request to further share (e.g., re-share) the post with an additional user account. The user who is permitted to view the post may be accessing the post in the social networking service via a client computing device (e.g., client computing device 330). In response, the further share existing post module 510 determines whether the additional user account is within the maximum scope (e.g., maximum scope 414.$k$) for the post. If the additional user account is within the maximum scope, then the further share existing post module 510 provides the indication of the post to the additional user account. When a user associated with the third user account accesses the social networking service, the post is presented in a feed of the additional user account. If the additional user account is not within the maximum scope, then the further share existing post module 510 foregoes providing the indication of the post to the additional user account.

The display post module 512 is configured to receive, via a specified user account, a request to view a post (e.g., post 408.$k$) within the social networking service. The request to view the post can be a request to view a single post or a request to view a feed or a stream that includes multiple posts that include the post. For example, the user may request to view his/her own content stream by logging into the social network or the user may access a feed of one of his/her social contacts that includes multiple posts by the social contact. The specified user account may be accessed via a client computing device (e.g., client computing device 330). In one example, the client computing device may be logged into the specified user account and may attempt to access a uniform resource locator (URL) associated with the post (e.g., via a link in an electronic message). The user may see the URL associated with the post while the user is not within the maximum scope for the post, for example, if another user who is within the maximum scope sends, to the user, an electronic message (e.g., an email message) including a link to the post. The display post module 512 is configured to determine whether the post has been shared with the specified user account (e.g., whether the specified user account is one of the viewing entities 412.$k$) and whether the specified user account is within the maximum scope for the post (e.g., maximum scope 414.$k$). If the post has been shared with the specified user account and the specified user account is within the maximum scope for the post, then the display post module 512 provides, to the client computing device associated with the specified user account, the post for display. If the post has not been shared with the specified user account or the specified user account is not within the maximum scope for the post, then the display post module 512 foregoes providing, to the client computing device associated with the specified user account, the post for display.

Figure 6:
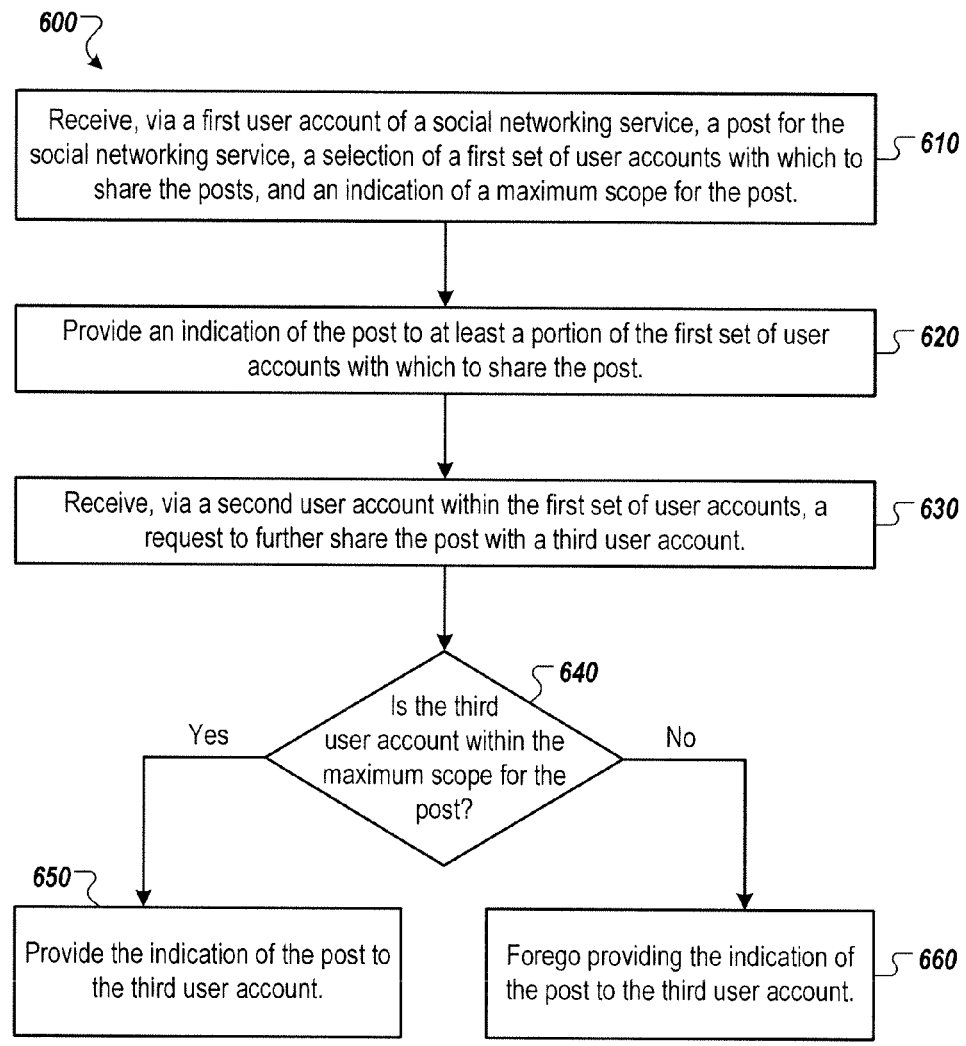
FIG. 6 illustrates an example process by which a scope of a post in a social networking service may be restricted.

FIG. 6 illustrates an example process 600 by which a scope of a post in a social networking service may be restricted.

In step 610, the server (e.g., server 320) receives, via a first user account of a social networking service (e.g., via a client computing device that is accessing the first user account), a post (e.g., post 408.k) for the social networking service, a selection of a first set of user accounts with which to share the post (e.g., viewing entities 412.k), and an indication of a maximum scope for the post (e.g., maximum scope 414.k). For example, the post, the selection of the first set of user accounts with which to share the post, and the maximum scope, may be entered via the interfaces 100A and 100B of FIGS. 1A and 1B.

The maximum scope may be global (e.g., all users of the social networking service or all Internet users, even those lacking an account in the social networking service). Alternatively, the maximum scope may include all or a portion of user accounts within an enterprise domain (e.g., ABC Corporation, ABC Corporation Marketing Group, or ABC Corporation Marketing Group and ABC Corporation Sales Group, etc.). Membership in an enterprise domain may be determined based on an electronic messaging address associated with an account. For example, a user account may be associated with the ABC Corporation enterprise domain if the user account is associated with a *@ABC-Corp.com email address. Otherwise, the user account may not be associated with the ABC Corporation enterprise domain.

In some examples, the maximum scope may be defined based on a geographic location specification (e.g., all users who live or work within 100 kilometers of New York City). The geographic location specification may include one or more of a current geographic location, a home geographic location, a work geographic location, or a default geographic location. However, a user of the social networking service may refuse to share any of these geographic locations with the social networking service or with a portion of the users in the social networking service.

In some examples, the maximum scope may be defined based on a time specification. The time specification may include a start time or an end time. For example, the maximum scope may specify that a post may only be shared before Jun. 30, 2012, or that the post may only be shared during the week of Jul. 16-22, 2012.

In some aspects, the maximum scope is defined with one or more logical operators (e.g., AND, OR, XOR, or NOT). The logical operators may be used to create multiple different specifications for the maximum scope (e.g., a geographic location specification and a time specification). Example definitions of maximum scope using logical operators are illustrated in FIG. 2 at elements 206, 208, 210, and 212.

In some aspects, for a first user account accessing the social networking service via an enterprise account, a default maximum scope may be defined by an enterprise administrator. However, the user may override the maximum scope set by the enterprise administrator to have a different maximum scope for a specific post. In some aspects, the enterprise administrator may require that the maximum scope for posts by the user be narrower than (i.e., include a subset of the accounts of) or identical to the maximum scope defined by the enterprise administrator. For example, an enterprise administrator at ABC Corporation may not want posts by the employees of ABC Corporation, who access the social network using their enterprise accounts, to be viewable by users who are not employed by ABC Corporation. To ensure that posts by the employees of ABC Corporation are not viewable by users who are not employed by ABC Corporation, the enterprise administrator may require that all enterprise social networking accounts of ABC Corporation employees have a maximum scope that is narrower than or identical to "Employed at ABC Corporation."

A maximum scope may be defined or based on one or more domains. A domain may include an enterprise domain (e.g., ABC Corporation), an educational domain (e.g., First City Campus of State University), an organization domain (e.g., Help Needy Families of First City Volunteers), or any other known static domain. Alternatively, the domain may include a dynamic domain, which may be defined based on attributes, location, time, and/or other dynamic domains. For example, a domain may include users who checked in at MNO Restaurant within the last week or users who are currently located within half a kilometer of MNO Restaurant.

In step 620, the server provides an indication of the post to at least a portion of the first set of user accounts with which to share the post. For example, the post may appear in the social network feeds for the portion of the first set of user accounts. When a client computing device logs into the social networking service via a user account in the first set, the post may be displayed in a feed presented via the client computing device.

In some aspects, the first set of user accounts with which to share the post may include a user account corresponding to an electronic messaging address. The electronic messaging address may not be associated with an account in the social networking service. If the server determines that that the electronic messaging address corresponds to an account within the maximum scope based on the electronic messaging address (e.g., if the maximum scope corresponds to ABC Corporation, and the electronic messaging address is a *@ABC-Corp.com email address), the server may provide an indication of the post to the user account via the electronic messaging address in conjunction with an invitation to open an account with the social networking service. If the server determines that the electronic messaging address does not correspond to an account within the maximum scope, the process 700 of FIG. 7, described in detail below, may be used to verify the intent of the posting user to modify the maximum scope or to avoid sharing the post with the user account outside the maximum scope.

In step 630, the server receives, via a second user account within the first set of user accounts (e.g., via a client computing device logged into a second user account), a request to further share (e.g., re-share) the post with a third user account.

In step 640, the server determines whether the third user account is within the maximum scope for the post (as entered in step 610). If so, the process 600 continues to step 650. If not, the process 600 continues to step 660.

In step 650, if the third user account is within the maximum scope for the post, the server provides an indication of the post to the third user account. For example, the post may appear in the social network feeds for the third user account. When a client computing device logs into the social networking service via the third user account, the post may be displayed in a feed presented via the client computing device.

In step 660, if the third user account is not within the maximum scope for the post, the server foregoes providing the indication of the post to the third user account based on the third user account not being within the maximum scope for the post. As a result, the maximum scope entered by the posting user is enforced and the post is not shared with user accounts outside the maximum scope.

Figure 7:
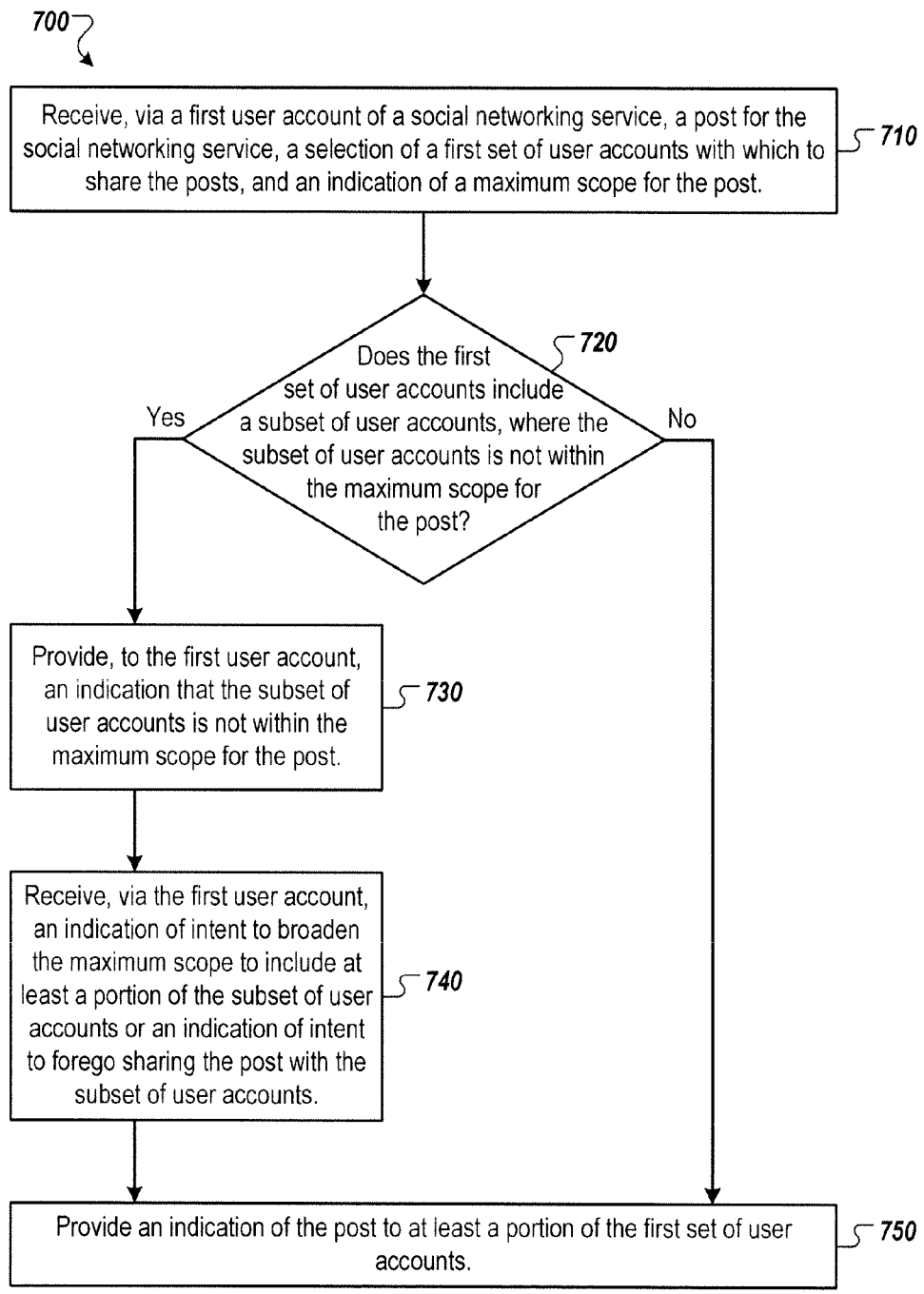
FIG. 7 illustrates an example process by which data may be posted in a social networking service.

FIG. 7 illustrates an example process 700 by which data may be posted in a social networking service.

In step 710, where a server (e.g., server 320) receives, via a first user account of a social networking service (e.g., being accessed on a client computing device) a post for the social networking service, a selection of a first set of user accounts with which to share the post, and an indication of a maximum scope for the post. For example, as illustrated in FIG. 1B, the first set of user accounts with which to share the post includes ABC Corporation Marketing Group, Jim DEF, and Cindy.GHI@XYZ.edu. The maximum scope is ABC Corporation. Step 710 of the process 700 may correspond to step 610 of process 600.

In step 720, the server determines whether the first set of user accounts includes a subset of user accounts, where the subset of user accounts is not within the maximum scope for the post. For example, as illustrated in FIG. 1B, Jim DEF and Cindy.GHI@XYZ.edu may or may not be within the maximum scope (ABC Corporation) for the post. If the first set of user account includes such a subset of user accounts, the process 700 continues to step 730. If the first set of user accounts does not include such a subset of user accounts, the process 700 continues to step 750.

In step 730, if the first set of user accounts includes the subset of user accounts, where the subset of user accounts is not within the maximum scope for the post, the server provides, to the first user account, (e.g., via a client computing device) an indication that the subset of user accounts is not within the maximum scope for the post (e.g., via pop-up window 100C of FIG. 1C). The indication may identify the maximum scope or the subset of user accounts.

In step 740, the server receives, via the first user account, an indication of intent to broaden the maximum scope to include at least a portion of the subset of user accounts (e.g., a selection of the Edit Maximum Scope button 138 of FIG. 1C) or an indication of intent to forego sharing the post with the subset of user accounts (e.g., a selection of the Edit Sharing button 140 of FIG. 1C). As a result of steps 730 and 740, a user may avoid accidentally sharing information with another user who is not within the maximum scope for the post.

If the first user account is not the account that posted the post or if an administrator (e.g., an enterprise administrator) prevented modification of the maximum scope for the posts of the first user, the first user account is unable to modify the maximum scope. In such circumstances, the first user account receives (e.g., on a client computing device accessing the first user account) a notification that the post cannot be shared with the users outside the maximum scope.

In step 750, the server provides an indication of the post to at least a portion of the first set of user accounts. The portion of the first set of user account includes user accounts that are within the maximum scope, as originally selected or modified by the first user account. Step 700 of the process 700 may correspond to step 620 of the process 600.

Figure 8:
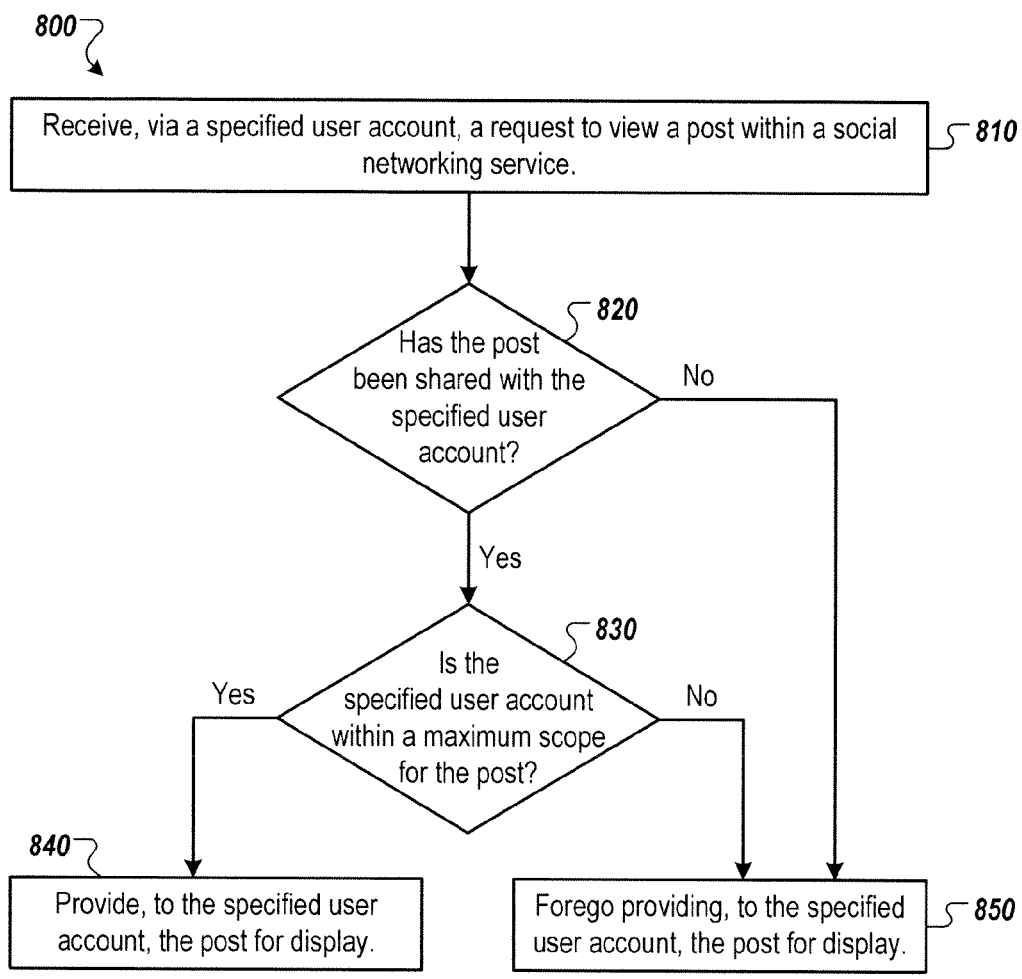
FIG. 8 illustrates an example process by which a user may view a post in a social networking service.

FIG. 8 illustrates an example process 800 by which a user may view a post in a social networking service.

In step 810, where a server (e.g., server 320) receives, via a specified user account, a request to view a post within a social networking service. For example, a user of a client computing device logged into the user account may enter a uniform resource locator (URL) corresponding to the post or select a link to the URL. Alternatively, the user of the client computing device may request to view a feed or a stream that contains the post.

In step 820, the server determines whether the post has been shared with the specified user account (e.g., if the user account is within the viewing entities 412.$k$ corresponding to the post 408.$k$). If so, the process 800 continues to step 830. If not, the process 800 continues to step 850.

In step 830, if the post has been shared with the specified user account, the server determines whether the specified user account is within a maximum scope for the post or whether the maximum scope for the post (e.g., expressed in terms of time or geography) allows sharing the post with the specified user account. The specified user account may be within the maximum scope for the post if the user account is within a set of user accounts (as defined in the maximum scope) that can view the post. If so, the process 800 continues to step 840. If not, the process 800 continues to step 850.

In step 840, if the post has been shared with the specified user account and the specified user account is within the maximum scope for the post, the server provides, to the specified user account (accessed via a client computing device), the post for display.

In step 850, if the post has not been shared with the specified user account or the specified user account is not within the maximum scope for the post, the server foregoes providing, to the specified user account, the post for display.

The subject technology is described above in conjunction with posts in a social networking service. However, the subject technology may also be applicable to other content items that may be shared and to which access may be restricted by a posting user. For example, the subject technology could be used with documents in a document sharing service or videos in a video sharing service in place of or in addition to posts in a social networking service, as described above.

Although certain examples provided herein describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

Figure 9:
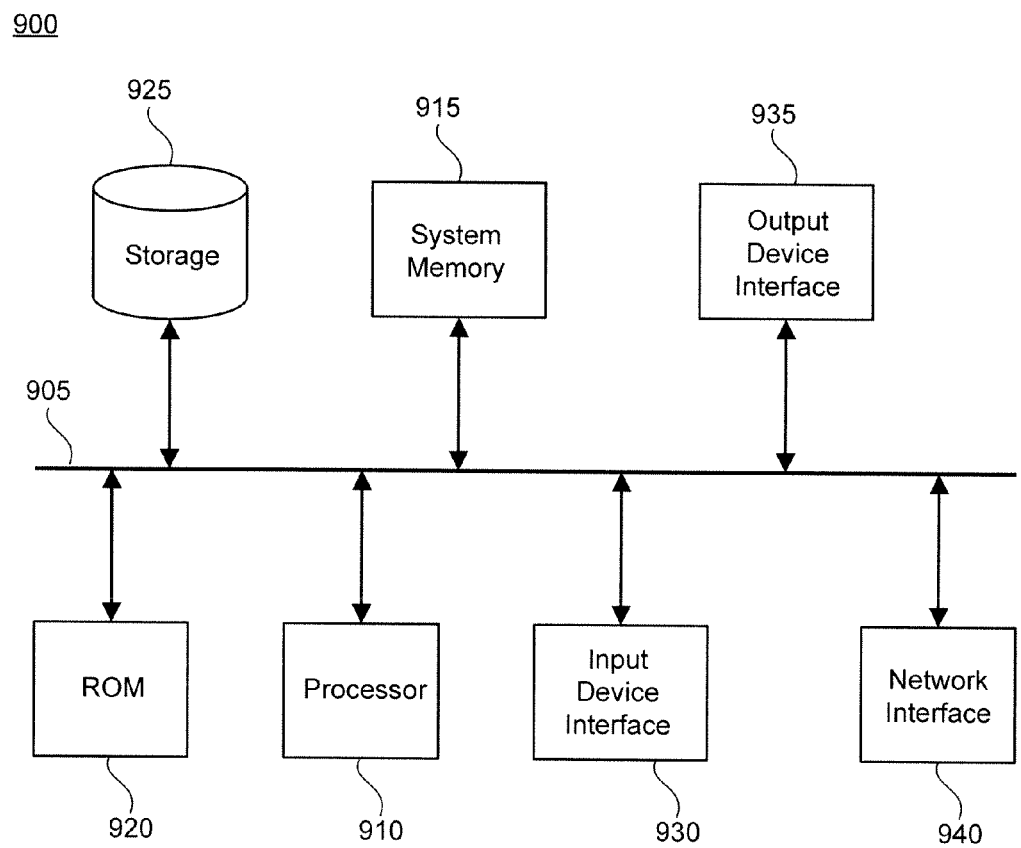
FIG. 9 conceptually illustrates an example electronic system with which some implementations of the subject technology are implemented.

FIG. 9 conceptually illustrates an electronic system 900 with which some implementations of the subject technology are implemented. For example, one or more of the data repository 310, the server 320, or the client computing device 330 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for restricting a scope of a post in a social networking service in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example, liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
    receiving, from a first user, a post for a specified first plurality of users;
    providing the post to at least a portion of the first plurality of users;
    receiving, from a second user within the first plurality of users, a request to share the post with a specified third user;
    determining a maximum scope for the post by:
        determining a default maximum scope set by an administrator;
        determining whether the default maximum scope has been overridden by the first user via a user input specifying a different maximum scope; and
        setting the maximum scope for the post to the different maximum scope when the default maximum scope has been overridden, otherwise setting the maximum scope for the post to the default maximum scope, wherein the maximum scope provides one or more parameters to control sharing of the post without listing specific users;

determining if the third user is within the determined maximum scope for the post; and foregoing providing the post to the third user if the third user is not determined to be within the maximum scope for the post.

2. The method of claim 1, wherein the maximum scope for the post comprises all or a portion of users within a domain.

3. The method of claim 2, wherein the domain is fixed.

4. The method of claim 2, wherein the domain changes over time.

5. The method of claim 1, wherein the maximum scope is defined based on one or more attributes.

6. The method of claim 1, wherein the maximum scope is defined based on a geographic location associated with a user of a social network.

7. The method of claim 6, wherein the geographic location associated with the user of the social network comprises one or more of a current geographic location, a home geographic location, a work geographic location, or a default geographic location of the user of the social network.

8. The method of claim 1, wherein the maximum scope is defined based on a time specification, and wherein the time specification comprises at least a start time and an end time.

9. The method of claim 1, wherein the maximum scope is defined with one or more logical operators.

10. The method of claim 1, further comprising:
determining that the first plurality of users comprises users that are not within the maximum scope for the post;
providing, to the first user, an indication that the users are not within the maximum scope for the post; and
receiving, from the first user, an indication of intent to broaden the maximum scope to include at least a portion of the users or an indication of intent to forego sharing the post with the users.

11. The method of claim 1, further comprising:
receiving, from a fourth user, a request to view the post;
determining whether the fourth user is within the maximum scope for the post;
if the post has been shared with the fourth user and the fourth user is within the maximum scope for the post:
providing, to the fourth user, the post for display; and
if the post has not been shared with the fourth user or the fourth user is not within the maximum scope for the post:
foregoing providing, to the fourth user, the post for display.

12. The method of claim 1, wherein the different maximum scope specified by the user input is less restrictive than the default maximum scope.

13. The method of claim 12, wherein determining the maximum scope for the post comprises:
determining the maximum scope for the post based on an intersection of the default maximum scope and the maximum scope specified in the user input.

14. The method of claim 12, further comprising:
receiving, from the first user, an indication of the maximum scope, wherein the maximum scope for the post is determined based on the received indication of the maximum scope; and
verifying that the determined maximum scope for the post is within the default maximum scope set by the administrator.

15. A non-transitory computer-readable medium comprising instructions which, when implemented by one or more computers, cause the one or more computers to implement a method, the method comprising:
providing, for display to a first user, a first graphical user interface element for entering a post for a social networking service;
providing, for display to the first user, a second graphical user interface element for specifying one or more viewing users with which to share the post;
providing, for display to the first user, a third graphical user interface element for selecting a maximum scope for the post, the maximum scope providing one or more parameters to control sharing of the post without listing specific users, wherein the third graphical user interface element indicates a default maximum scope and is configured to receive an input from the first user for selecting a different maximum scope than the default maximum scope;
receiving the post, a selection of the one or more viewing users, and a selection of the maximum scope from the first user via the first, second, and third graphical user interface elements, respectively;
determining whether the maximum scope selected from the third graphical user interface element encompasses each of the one or more viewing users;
when the maximum scope selected from the third graphical user interface element encompasses one or more of the one or more viewing users selected in the second graphical user interface element, sending, to the one or more of the one or more viewing users, the post; and
when the maximum scope selected from the third graphical user interface element does not encompass at least one of the one or more viewing users selected in the second graphical user interface element, providing, for display, an input for modifying the selected maximum scope.

16. The computer-readable medium of claim 15, wherein the default maximum scope is selected by an administrator.

17. The computer-readable medium of claim 15, wherein the third graphical user interface element comprises one or more selectors for one or more social groups or one or more individual users of the social networking service.

18. A system comprising:
one or more processors; and
a memory comprising instructions which, when executed by the one or more processors, cause the one or more processors to implement a method, the method comprising:
receiving, from an administrator for plural users of a social networking service, a default maximum scope for posts by the plural users;
receiving, from a first user from among the plural users of the social networking service, a first post for the social networking service and a selection of a first set of users with which to share the post;
determining a maximum scope for the first post by:
determining the default maximum scope set by the administrator;
determining whether the default maximum scope has been overridden by the first user via a user input specifying a different maximum scope; and
setting the maximum scope for the post to the different maximum scope when the default maximum scope has been overridden by the first user, otherwise setting the maximum scope for the post to the default maximum scope, wherein the maximum scope provides one or more parameters to control sharing of the first post without listing specific users;

determining whether the maximum scope encompasses each of the first set of users;

when the maximum scope encompasses one or more of the first set of users, sending the post to each of the one or more of the first set of users; and when the maximum scope does not encompass at least one user of the first set of users, providing, to the first user, an indication that the at least one user is not included in the maximum scope.

19. The system of claim 18, wherein the method further comprises:

determining, based on settings entered by the administrator, whether the maximum scope is user-modifiable;

if the maximum scope is user-modifiable, providing instructions, to the first user, to modify the maximum scope or the first set of users; and if the maximum scope is not user-modifiable, providing a notification, to the first user, that the post cannot be shared with the at least one user.

* * * * *